United States Patent
Nagae et al.

(10) Patent No.: US 12,539,690 B2
(45) Date of Patent: Feb. 3, 2026

(54) JOINED BODY

(71) Applicant: NGK INSULATORS, LTD., Nagoya (JP)

(72) Inventors: Tomoki Nagae, Nagoya (JP); Takahiro Yamadera, Nagoya (JP); Kota Ozeki, Kitanagoya (JP); Hirotomo Takahama, Handa (JP)

(73) Assignee: NGK INSULATORS, LTD., Nagoya (JP)

( * ) Notice: Subject to any disclaimer, the term of this patent is extended or adjusted under 35 U.S.C. 154(b) by 0 days.

(21) Appl. No.: 18/897,101

(22) Filed: Sep. 26, 2024

(65) Prior Publication Data

US 2025/0018690 A1 Jan. 16, 2025

Related U.S. Application Data

(63) Continuation of application No. PCT/JP2024/010094, filed on Mar. 14, 2024.

(30) Foreign Application Priority Data

May 9, 2023 (JP) ................................ 2023-077440

(51) Int. Cl.
  *B32B 18/00* (2006.01)
(52) U.S. Cl.
  CPC ...... *B32B 18/00* (2013.01); *B32B 2307/7376* (2023.05)
(58) Field of Classification Search
  CPC .............................. B32B 18/00; C30B 29/20
  See application file for complete search history.

(56) References Cited

U.S. PATENT DOCUMENTS

| | | | | |
|---|---|---|---|---|
| 11,107,973 B2 * | 8/2021 | Tai | ................ | H10N 30/706 |
| 11,133,788 B2 * | 9/2021 | Uno | ................ | H03H 9/25 |
| 11,139,427 B2 * | 10/2021 | Uno | ................ | H03H 3/08 |
| 11,888,462 B2 * | 1/2024 | Uno | ................ | H10N 30/073 |
| 11,984,870 B2 * | 5/2024 | Uno | ................ | H03H 9/02559 |
| 2014/0210317 A1 | 7/2014 | Tai et al. | | |
| 2019/0309936 A1 | 10/2019 | Kondo et al. | | |
| 2020/0373905 A1 | 11/2020 | Tai et al. | | |
| 2023/0250555 A1 | 8/2023 | Kuraoka et al. | | |

FOREIGN PATENT DOCUMENTS

| | | |
|---|---|---|
| JP | H06-247776 A | 9/1994 |
| JP | H08-268771 A | 10/1996 |
| JP | 2020-102856 A | 7/2020 |

(Continued)

OTHER PUBLICATIONS

WO 2015/174253 (Nov. 2015).*

(Continued)

*Primary Examiner* — Elizabeth E Mulvaney
(74) *Attorney, Agent, or Firm* — BURR PATENT LAW, PLLC

(57) ABSTRACT

A joined body includes: a first plate; a second plate of a same type as or a different type from a type of the first plate; an amorphous layer existing at a joint interface between the first plate and the second plate; a first plate alteration layer existing on a side of the first plate in contact with the amorphous layer; and a second plate alteration layer existing on a side of the second plate in contact with the amorphous layer.

5 Claims, 4 Drawing Sheets

(56) References Cited

FOREIGN PATENT DOCUMENTS

| JP | 2021-018998 A | 2/2021 |
| WO | 2014/077213 A1 | 5/2014 |
| WO | 2018/110316 A1 | 6/2018 |
| WO | 2022/079962 A1 | 4/2022 |

OTHER PUBLICATIONS

International Search Report and Written Opinion (Application No. PCT/JP2024/010094) dated May 14, 2024 (7 pages).

Ryo Takakura et al., "*Effect of Ar fast Atom Beam Irradiation on $\alpha\text{-}Al_2O_3$ for Surface Activated Room Temperature Bonding*," Japanese Journal of Applied Physics, Apr. 20, 2023, vol. 62, No. Sg, SG1046-1 to SG1046-5 (5 pages).

Japanese Office Action (with English translation) dated Oct. 7, 2025 (Application No. 2024-556774).

English translation of the International Preliminary Report on Patentability (Chapter I) dated Nov. 20, 2025 (Application No. PCT/JP2024/010094).

\* cited by examiner

JOINED BODY

BACKGROUND OF THE INVENTION

1. Field of the Invention

The present invention is related to a joined body.

2. Description of the Related Art

A known joined body is formed by joining, with a fast atom beam (FAB), a Si plate and a piezoelectric material plate to each other (for example, see PTL 1).

CITATION LIST

Patent Literature

PTL 1: Japanese Unexamined Patent Application Publication No. 2020-102856

SUMMARY OF THE INVENTION

However, a joined body with a high joint strength is not necessarily obtained depending on the material of two plates.

The present invention has been made to address such a problem, and main object of the present invention is to obtain a joined body with a high joint strength.

[1] A joined body of the present invention includes: a first plate; a second plate of a same type as or a different type from a type of the first plate; an amorphous layer existing at a joint interface between the first plate and the second plate; a first plate alteration layer existing on a side of the first plate in contact with the amorphous layer; and a second plate alteration layer existing on a side of the second plate in contact with the amorphous layer.

With this joined body, the joint strength is comparatively high.

[2] In the joined body according to the present invention (joined body described in [1] above), a thickness of the amorphous layer may be greater than or equal to 0.1 nm.

[3] In the joined body according to the present invention (joined body described in [1] or [2] above), a thickness of the first plate alteration layer may be greater than or equal to 10 nm, and a thickness of the second plate alteration layer may be greater than or equal to 10 nm.

[4] In the joined body according to the present invention (joined body described in any one of [1] to [3] above), the first plate may be a dense body, and the second plate may be a dense body.

[5] In the joined body according to the present invention (joined body described in any one of [1] to [4] above), the first plate may be formed of a metal compound, and the second plate may be formed of a metal compound of a same type as or a different type from a type of the metal compound of the first plate. The metal compound may be one selected from the group consisting of metal oxide, metal nitride, and metal carbide. At least one of the first plate and the second plate may be formed of ceramic. Both the first plate and the second plate may be formed of alumina ceramic.

[6] In the joined body according to the present invention (joined body described in any one of [1] to [5] above), a diameter of the joined body may be greater than or equal to 100 mm and smaller than or equal to 500 mm.

DETAILED DESCRIPTION OF THE INVENTION

Figure 1:
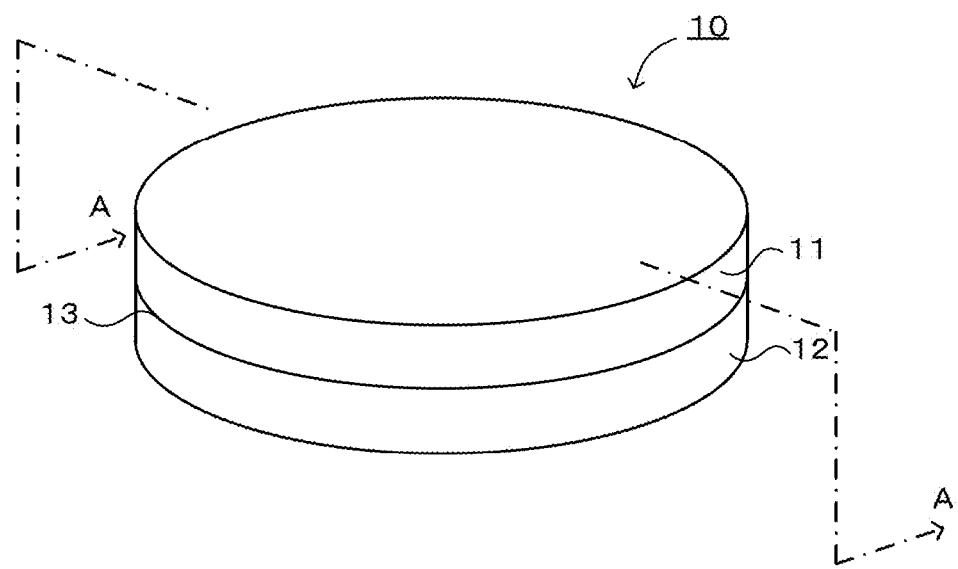
FIG. 1 is a perspective view of a joined body 10.
Figure 2:
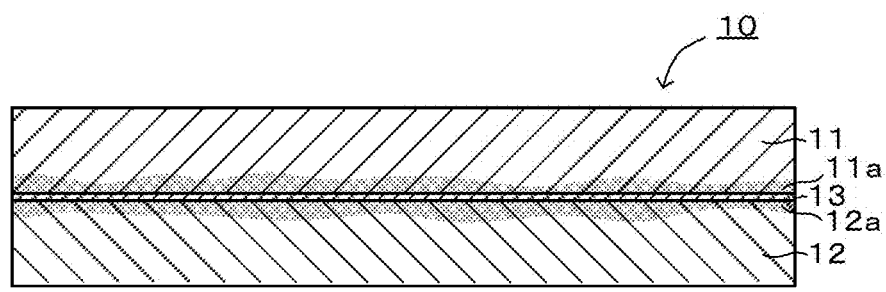
FIG. 2 is a sectional view taken along line A-A illustrated in FIG. 1.

A preferred embodiment of the present invention is described below with reference to the drawings. FIG. 1 is a perspective view of a joined body 10. FIG. 2 is a sectional view taken along line A-A illustrated in FIG. 1.

The joined body 10 includes a first plate 11, a second plate 12, and an amorphous layer 13. When the material of the first plate 11 and the material of the second plate 12 are of different types, the one or more amorphous layers 13 may be provided. The diameter of the joined body 10 may be, for example, greater than or equal to 100 mm and smaller than or equal to 500 mm.

The first plate 11 is formed of a metal compound. The metal compound may be, for example, one selected from the group consisting of metal oxide, metal nitride, and metal carbide. Examples of the metal oxide include, for example, $Al_2O_3$ and the like. Examples of the metal nitride include, for example, AlN, $Si_3N_4$, and the like. Examples of the metal carbide include, for example, SiC and the like. The thickness of the first plate 11 is, for example, greater than or equal to 100 μm and smaller than or equal to 15 mm. The first plate 11 may be a dense body.

The second plate 12 is formed of a metal compound of the same type as or a different type from the type of the metal compound of the first plate 11. The second plate 12 may be formed of a metal compound of the same type as the type of the metal compound of the first plate 11 but having different characteristics (for example, a plasma resistance, thermal conductivity, volume resistivity, and the like) from the characteristics of the metal compound of the first plate 11. The metal compound may be, for example, one selected from the group consisting of metal oxide, metal nitride, and metal carbide. Examples of the metal oxide include, for example, $Al_2O_3$ and the like. Examples of the metal nitride include, for example, AlN, $Si_3N_4$, and the like. Examples of the metal carbide include, for example, SiC and the like. The thickness of the second plate 12 is, for example, greater than or equal to 100 μm and smaller than or equal to 15 mm. The second plate 12 may be a dense body.

At least one of the first plate 11 and the second plate 12 may be formed of ceramic. Both the first plate 11 and the second plate 12 may be formed of alumina ceramic. Alternatively, the first plate 11 may be formed of sapphire, and the second plate 12 may be formed of alumina ceramic.

The amorphous layer 13 exists at a joint interface between the first plate 11 and the second plate 12. A peak of the amorphous layer 13 that appears when, for example, XRD is measured is broader than a peak of the first plate 11 or the second plate 12. In an enlarged sectional image of the joined body 10 with a transmission electron microscope (TEM), the amorphous layer 13 is observed as a thin belt. The thickness of the amorphous layer 13 is preferably greater than or equal to 0.1 nm, more preferably greater than or equal to 0.1 nm and smaller than or equal to 30 nm, and even more preferably greater than or equal to 1 nm and smaller than or equal to 20 nm. A measurement value of the thickness of the amorphous layer 13 through the TEM observation is obtained in the following procedure. In a single field of view of a TEM photograph (magnification: four million times), the thickness of the amorphous layer 13 is measured at five points along the joint interface at intervals of 10 nm to obtain an average value of the thickness of the amorphous layer in the single field of view. Similar thickness measurement through the TEM observation is performed at three fields of view including fields of views, in non-biased manner, around the center, around the periphery, and around the center of the radius in plan view of a member for semiconductor manufacturing apparatus. Then, an average value of the thicknesses of the amorphous layer 13 in three fields of view is set as the measurement value.

The first plate 11 includes a first plate alteration layer 11a on a side thereof in contact with the amorphous layer 13. A peak of the first plate alteration layer 11a that appears when, for example, the XRD is measured is broader than a peak of a portion of the first plate 11 other than the first plate alteration layer 11a and sharper than the peak of the amorphous layer 13. In the enlarged sectional image of the joined body 10 with the TEM, the first plate alteration layer 11a is observed as a form different from a form of the portion of the first plate 11 other than the first plate alteration layer 11a. The thickness of the first plate alteration layer 11a is preferably greater than or equal to 10 nm, more preferably greater than or equal to 100 nm and smaller than or equal to 1 μm, and even more preferably greater than or equal to 100 nm and smaller than or equal to 600 nm.

The second plate 12 includes a second plate alteration layer 12a on a side thereof in contact with the amorphous layer 13. A peak of the second plate alteration layer 12a that appears when, for example, the XRD is measured is broader than a peak of a portion of the second plate 12 other than the second plate alteration layer 12a and sharper than the peak of the amorphous layer 13. In the enlarged sectional image of the joined body 10 with the TEM, the second plate alteration layer 12a is observed as a form different from a form of the portion of the second plate 12 other than the second plate alteration layer 12a. The thickness of the second plate alteration layer 12a is preferably greater than or equal to 10 nm, more preferably greater than or equal to 100 nm and smaller than or equal to 1 μm, and even more preferably greater than or equal to 100 nm and smaller than or equal to 600 nm. Measurement values of the thicknesses of the first plate alteration layer 11a and the second plate alteration layer 12a through the TEM observation are obtained in the following procedure. In a single field of view of a TEM photograph (magnification: half a million times), the thicknesses of the first plate alteration layer 11a and the second plate alteration layer 12a are measured at five points along the joint interface at intervals of 200 nm to obtain average values of the thicknesses of the first plate alteration layer 11a and the second plate alteration layer 12a in the single field of view. Similar thickness measurement through the TEM observation is performed at three fields of view including fields of views, in non-biased manner, around the center, around the periphery, and around the center of the radius in plan view of a member for semiconductor manufacturing apparatus. Then, average values of the thicknesses of the first plate alteration layer 11a and the second plate alteration layer 12a in three fields of view are set as the measurement values.

Next, an example of usage of the joined body 10 is described. The joined body 10 can be utilized as an electrostatic chuck. In this case, the first plate 11 is formed of a dense body of ceramic (for example, alumina ceramic), and an electrostatic electrode is embedded in the first plate 11.

Next, an example of the manufacture of the joined body 10 is described. First, the first plate 11 and the second plate 12 are fabricated. For example, the first plate 11 may be fabricated by hot-press firing a molded body including metal compound powder (for example, ceramic powder). In this way, the first plate 11 can be a dense body. The second plate 12 is fabricated in a similar manner to the first plate 11. At this stage, the first plate 11 does not include the first plate alteration layer 11a. Likewise, the second plate 12 does not include the second plate alteration layer 12a.

Figure 3:
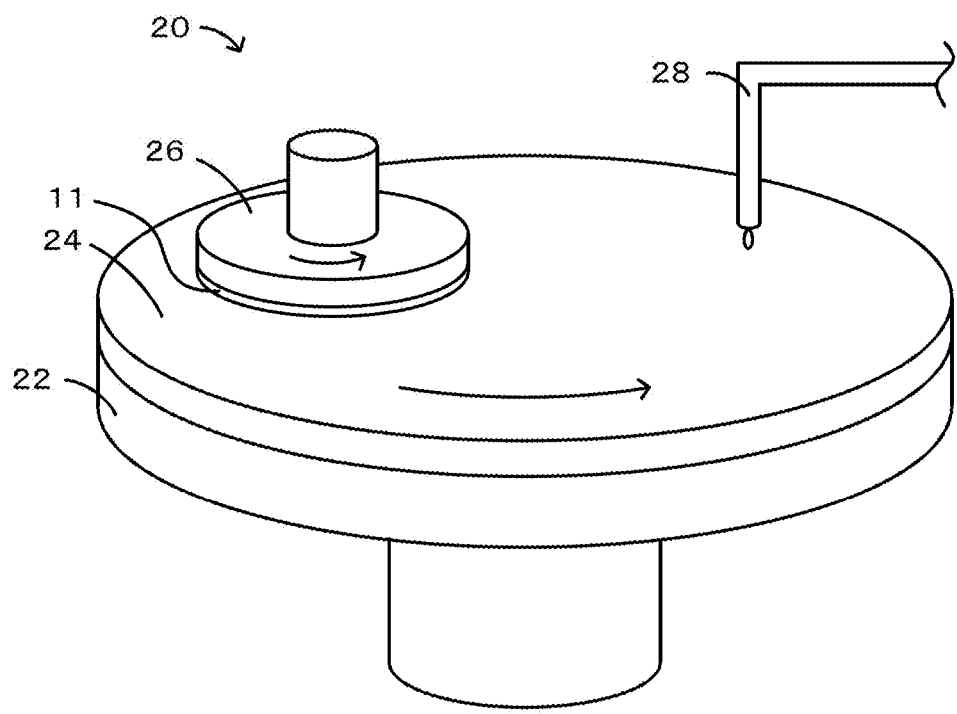
FIG. 3 is an explanatory view of a polishing device 20.

Then, lap polishing is performed on the first plate 11 with a polishing device 20 illustrated in FIG. 3. The polishing device 20 includes a polishing surface plate 22 that includes a polishing pad 24 and has a discoidal shape having a large diameter, a carrier 26 that has a discoidal shape having a small diameter, and a pipe 28 through which slurry including polishing abrasive grains is supplied to the polishing pad 24. The polishing surface plate 22 includes a shaft at a center of a lower surface and rotates about the axis (rotation) when the shaft is rotated by a drive motor (not illustrated). The carrier 26 includes a shaft at a center of an upper surface and rotates about the axis (rotation) when the shaft is rotated by a drive motor (not illustrated). The carrier 26 is disposed at a position offset from the center of the polishing surface plate 22. When polishing the first plate 11 with this polishing device 20, the first plate 11 is attached to a lower surface of the carrier 26, and the first plate 11 is interposed between the polishing pad 24 of the polishing surface plate 22 and the carrier 26. Then, the slurry including the polishing abrasive grains is supplied to the polishing pad 24 through the pipe 28. Thus, the slurry is supplied between the first plate 11 and the polishing pad 24 of the polishing surface plate 22. In this state, polishing is performed by rotating the polishing surface plate 22 and the carrier 26 while the first plate 11 is pressed against the polishing pad 24 with the carrier 26. In the polishing, the polishing conditions are set so that a surface roughness (arithmetic average roughness) Ra of a lower surface of the first plate 11 is smaller than or equal to 1 nm. In the polishing conditions, for example, slurry having an average diameter of the abrasive grains is smaller than or equal to 1 μm is used, and the numbers of rotation of the polishing surface plate 22 and the carrier 26 are set to 20 to 200 rpm. As a result, the surface roughness Ra of the polished surface of the first plate 11 becomes smaller than or equal to 1 nm. Furthermore, the first plate alteration layer 11a is formed on the polished surface side of the first plate 11. The surface roughness (arithmetic average roughness) Ra of the polished surface is measured with a surface roughness measurement device of non-contact type in accordance with the ISO 25178 standard.

Lap polishing is also performed on the second plate 12 with the polishing device 20 similarly to the case of the first plate 11. As a result, the surface roughness Ra of the polished surface of the second plate 12 becomes smaller than or equal to 1 nm. Furthermore, the second plate alteration layer 12a is formed on the polished surface side of the second plate 12.

Then, a fast atom beam (FAB) is radiated to the polished surface of the first plate 11 in high vacuum. Likewise, the FAB is also radiated to the polished surface of the second plate 12 in high vacuum. The conditions of the FAB are set, for example, as follows: voltage is 0.5 to 2 kV; current is 50 to 200 mA; and radiation time is 30 to 300 seconds. This removes oxides and attracted molecules on the polished surfaces of the first plate 11 and the second plate 12, and the polished surfaces become amorphous (activated). Then, the first plate 11 and the second plate 12 are superposed on each other so that the polished surface of the first plate 11 and the polished surface of the second plate 12 face each other, and the first plate 11 and the second plate 12 are joined to each other while being subjected to pressure. A load during application of the pressure is set to, for example, 0.1 to 50 kN. As a result, the joined body 10 having a high joint strength can be obtained.

With the joined body 10 having been described above, the joint strength of the plates 11 and 12 becomes comparatively high. In particular, even when both the first plate 11 and the second plate 12 are ceramic (for example, alumina ceramic), the joined body 10 with a good joint strength can be obtained. Since the joined body 10 with a good joint strength can be obtained as described above, for example, use of the joined body 10 for rework and in porous portions is possible.

The present invention should not be limited to the above-described embodiment and may be implemented in various modes without departing from the technical scope of the present invention.

EXAMPLE

An example of the present invention is described below. The following example does not limit the present invention.

Example 1

Figure 4A:
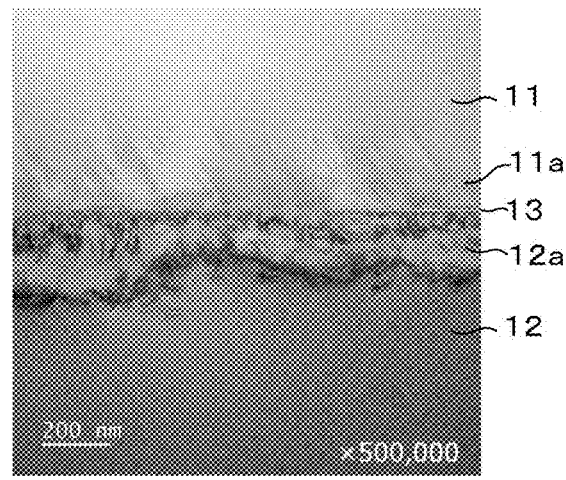
FIGS. 4A and 4B include TEM images of the joined body 10.
Figure 4B:
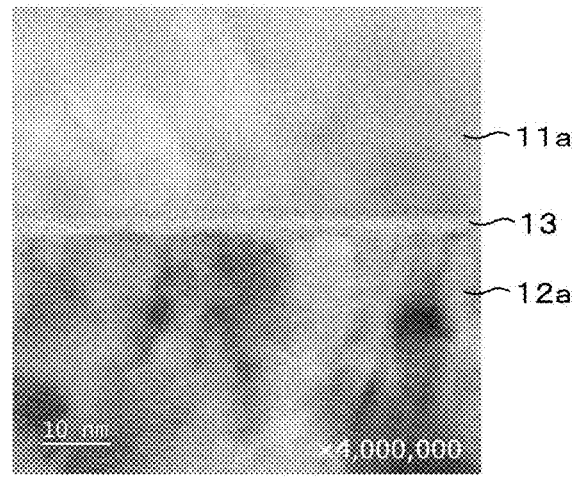

As the first plate 11 and the second plate 12, the following dense alumina ceramic plates were prepared: diameter is 100 mm; thickness is 600 μm; and degree of purity is equal to or higher than 99.9%. Next, with the polishing device 20, lap polishing was performed on the first plate 11 with small abrasive grains (average diameter of the abrasive grains is 0.1 μm) so that the surface roughness Ra of one of the surfaces of the first plate 11 was equal to or smaller than 0.5 nm. Furthermore, similarly to the case of the first plate 11, lap polishing was also performed on the second plate 12 so that the surface roughness Ra of one of the surfaces of the second plate 12 was equal to or smaller than 0.5 nm. Next, an Ar beam as the FAB was radiated to the polished surface of the first plate 11 in high vacuum, and the Ar beam as the FAB was also radiated to the polished surface of the second plate 12. Then, the first plate 11 and the second plate 12 were superposed on each other so that the polished surface of the first plate 11 and the polished surface of the second plate 12 faced each other, and the first plate 11 and the second plate 12 were joined to each other while being subjected to pressure. As a result, the joined body 10 was obtained. The section of the joined body 10 near the joint interface was enlarged with TEM to obtain images. The images obtained at that time are illustrated in FIGS. 4A and 4B. FIG. 4A is an image magnified half a million times. FIG. 4B is an image magnified four million times. From observation of the section with the TEM in the above-described method, the amorphous layer 13 (thin white belt-shaped portion) of a measured thickness of 4.5 nm exists at the joint interface between the first plate 11 and the second plate 12. Furthermore, the first plate alteration layer 11a is observed on the side of the first plate 11 in contact with the amorphous layer 13, and the second plate alteration layer 12a is observed on the side of the second plate 12 in contact with the amorphous layer 13. When measured values of the thicknesses of the alteration layers are checked by the observation of the section with the TEM in the above-described method, the alteration layers having thicknesses of the measured values of 300 nm are formed with both the first and second plates 11 and 12. When measured by a crack opening method, the joint strength of the obtained joined body 10 is 0.5 to 3.0 J/m2.

Comparative Example 1

The FAB joining was performed similarly to that of example 1 except for that large abrasive grains (average diameter of the abrasive grains is 20 μm) were used in lap polishing. As a result, although an alteration layer having a thickness greater than 1 μm in measured value was obtained, joining failed. It can be thought that the cause of this is roughening of the surface (surface roughness Ra is 100 nm) by using the larger abrasive grains.

The present application claims priority from Japanese Patent Application No. 2023-077440, filed May 9, 2023, the entire contents of which are incorporated herein by reference. International Application No. PCT/JP2024/010094, filed Mar. 14, 2024, is incorporated herein by reference in its entirety.

What is claimed is:

1. A joined body comprising:
a first plate;
a second plate of a same type as or a different type from a type of the first plate;
an amorphous layer existing at a joint interface between the first plate and the second plate;
a first plate alteration layer existing on a side of the first plate in contact with the amorphous layer; and
a second plate alteration layer existing on a side of the second plate in contact with the amorphous layer,
wherein the first plate and the second plate are both formed of dense alumina ceramic,
wherein the surface roughness Ra of the first plate on the side of the first plate in contact with the amorphous layer is less than or equal to 1 nm, and
wherein the surface roughness Ra of the second plate on the side of the second plate in contact with the amorphous layer is less than or equal to 1 nm.

2. The joined body according to claim 1,
wherein a thickness of the amorphous layer is greater than or equal to 0.1 nm.

3. The joined body according to claim 1,
wherein a thickness of the first plate alteration layer is greater than or equal to 10 nm, and a thickness of the second plate alteration layer is greater than or equal to 10 nm.

4. The joined body according to claim 1,
wherein a diameter of the joined body is greater than or equal to 100 mm and smaller than or equal to 500 mm.

5. The joined body according to claim 1,
wherein the joined body has a joint strength of from 0.5 to 3.0 J/m$^2$ as measured by a crack opening method.

* * * * *